United States Patent [19]

Yamada

[11] Patent Number: 5,293,274
[45] Date of Patent: Mar. 8, 1994

[54] TIMEBASE AXIS ERROR COMPENSATION APPARATUS IN AN INFORMATION RECORDING/REPRODUCTION APPARATUS

[75] Inventor: Hiroshi Yamada, Tokyo, Japan

[73] Assignee: Victor Company of Japna, Ltd., Yokohama, Japan

[21] Appl. No.: 96,859

[22] Filed: Jul. 26, 1993

Related U.S. Application Data

[63] Continuation of Ser. No. 713270, Jun. 11, 1991, abandoned.

[30] Foreign Application Priority Data

Jun. 11, 1990 [JP] Japan ................... 2-153186

[51] Int. Cl.$^5$ ........................................... H04N 5/78
[52] U.S. Cl. ........................... 360/36.2; 358/339
[58] Field of Search ............... 360/36.1, 38.1, 36.2; 358/314, 320, 323, 155, 37, 166, 339

[56] References Cited

U.S. PATENT DOCUMENTS

| | | | |
|---|---|---|---|
| 4,030,121 | 6/1977 | Faroudja | 358/37 |
| 4,160,265 | 7/1979 | Tanaka | 358/37 |
| 4,287,529 | 9/1981 | Tatami et al. | 360/38.1 X |
| 4,752,839 | 6/1988 | Lovely | 360/64 X |
| 4,802,025 | 1/1989 | Shinada | 360/36.1 X |
| 4,835,620 | 5/1989 | Sakamoto | 360/36.1 X |

FOREIGN PATENT DOCUMENTS

| | | |
|---|---|---|
| 2237769 | 2/1974 | Fed. Rep. of Germany . |
| 3103099 | 8/1982 | Fed. Rep. of Germany . |

*Primary Examiner*—Andrew L. Sniezek
*Attorney, Agent, or Firm*—Jacobson, Price, Holman & Stern

[57] ABSTRACT

A timebase error compensation apparatus is provided in a video tape recorder having a plurality of rotary reproducing heads from which signals are sequentially switched over to obtain a continuous reproduced video signal. The apparatus comprises a compensation circuit for compensating a timebase error included in the reproduced video signal; a detection circuit for detecting a horizontal scan line period during which the signal from one rotary reproducing head is switched over to the signal from another rotary reproducing head to generate a mask control signal; and a replacement circuit responsive to the mask control signal for replacing the reproduced video signal of the horizontal scan line period with the reproduced video signal of a horizontal scan line period adjoining to the horizontal scan line period.

3 Claims, 11 Drawing Sheets

TIMEBASE AXIS ERROR COMPENSATION APPARATUS IN AN INFORMATION RECORDING/REPRODUCTION APPARATUS

This is a continuation of application Ser. No. 07/713,270 filed Jun. 11, 1991 now abandoned.

BACKGROUND OF THE INVENTION

The present invention relates to a timebase error compensation apparatus for compensating the timebase error included in a video signal which is read from a recording medium by an information recording and reproduction apparatus such as a VTR having a plurality of rotary reproducing heads.

When there is a timebase error between horizontal sectors of video signal, the video signal is written to a memory by a clock that has the same timebase error so that it is possible to compensate for the timebase error by reading by a clock without a timebase error.

Figure 1:
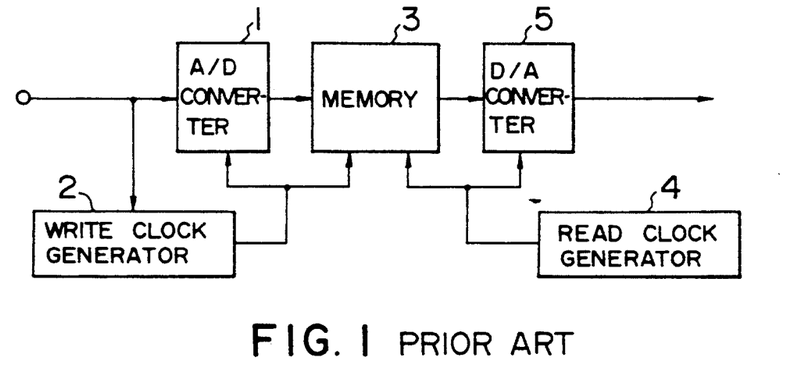
FIG. 1 is a block diagram showing the general configuration of a timebase error compensation apparatus.

FIG. 1 shows one example of a timebase error compensation apparatus that compensates for the timebase error of video signal. In the figure, the input video signal is input to an A/D converter 1, and undergoes A/D conversion by the write clock generated by a write clock generator 2 in synchronism with the input video signal. The video signal that has undergone A/D conversion is written to a memory 3 by the write clock and is then read by the reference read clock that is generated by a read clock generator 4, and converted into an analog signal by a D/A converter 5. The read clock is normally using a fixed clock realized by quartz crystal oscillation and so the accuracy of crystal oscillation is stable and so the timebase compensation performance is generally dependent upon the accuracy of the write clock.

Figure 2:
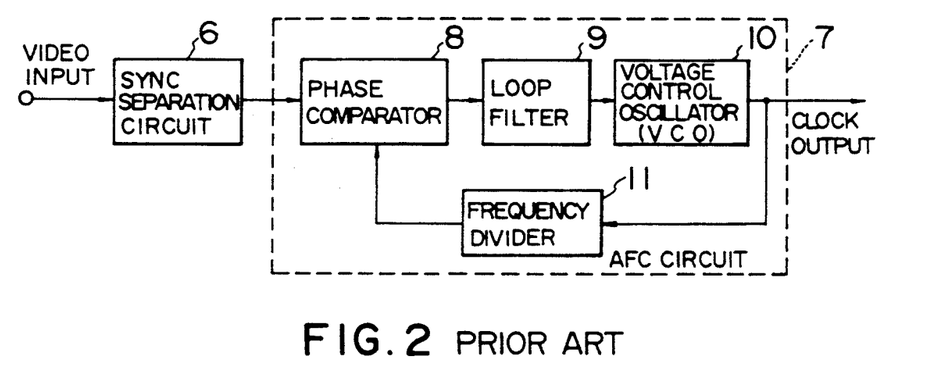
FIG. 2 is a block diagram showing the configuration of a conventional AFC circuit.

The write clock synchronized with the input signals, that is, the write clock that changes its phase corresponding to the timebase error, can be generated by an automatic frequency control (AFC) circuit shown in FIG. 2, for example.

More specifically, a sync separation circuit 6 separates the horizontal sync signal from the video signal, and inputs it to an automatic frequency control (AFC) circuit 7. The AFC circuit 7 is configured from a phase-locked loop (PLL) circuit comprising a phase comparator 8, a loop filter 9, a voltage controlled oscillator (VCO) circuit 10 and a frequency divider 11, and the VCO circuit 10 outputs a clock having the same timebase error as the horizontal sync signal.

The input video signal is input to the memory by this clock and is read out by a clock without a timebase error and so it is possible to obtain an output video signal having timebase error. However, the AFC circuit 7 has the loop band region determined by a time constant and frequency characteristics of the loop filter 9 and so it is not possible to raise the speed of response in order to obtain a stable performance, and therefore it is not possible to follow high-speed time changes.

Figure 3:
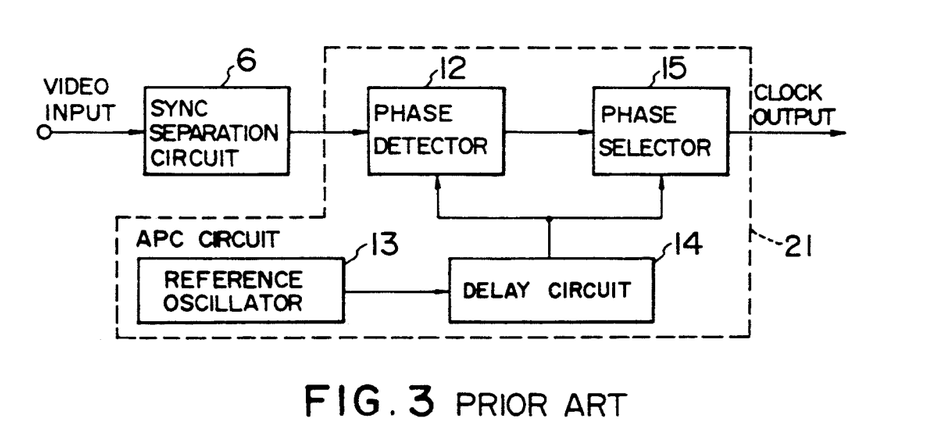
FIG. 3 is a block diagram showing the configuration of a conventional APC circuit.

Here, the AFC circuit changes the phase and the oscillation frequency in accordance with the elongation or contraction of the length of one horizontal scan period, and whereas the clock is phase-synchronized with the input signals, a clock generation circuit shown in FIG. 3, which can take the same phase as the phase within a single horizontal scan period, and which is known as an Automatic Phase Control (APC) method has been used in recent years.

The sync separation circuit 6 separates the horizontal sync signal from the video signal that have been input, and supplies it to a phase detector 12. An oscillator 13 outputs clock signal that has a fixed frequency, and inputs it to a delay circuit 14, which delays it by different predetermined times and generates clock signals of a plural number of phases. These clock signals that have multiple number of phases are supplied to the phase detector 12 and a phase selector 15.

The phase detector 12 compares the phase of the signals that have been input from the sync separation circuit 6 and the phases of the clock signals from the delay circuit 14 and outputs the phase errors that are the results of this comparison, to the phase selector 15. The phase selector 15 selects and outputs the clock signal that has the smallest phase error, in response to the outputs of the phase detector 12.

Figure 4:
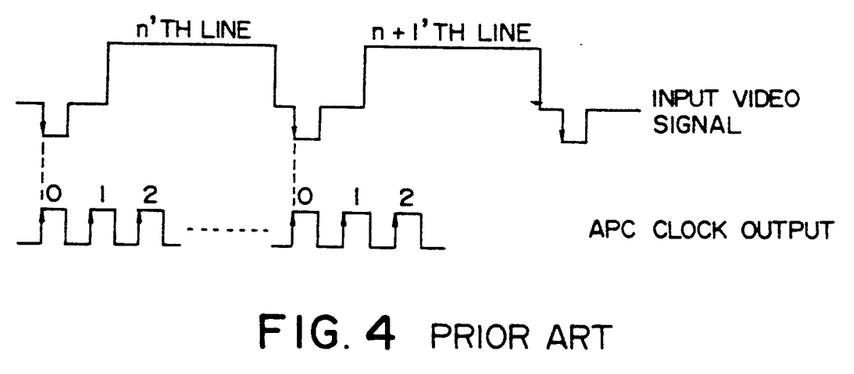
FIG. 4 is a timing chart for describing the operation of the APC circuit indicated in FIG. 3.
Figure 5:
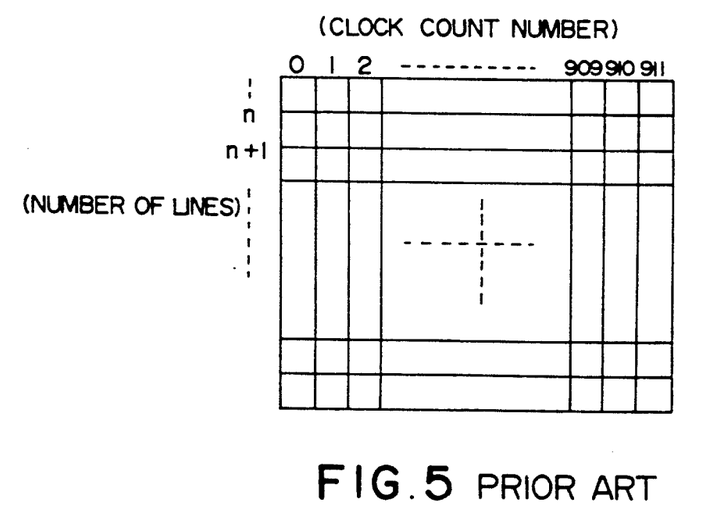
FIG. 5 is a view for describing the configuration of a memory, and is for describing conventional timebase error compensation operation.
Figure 6A:
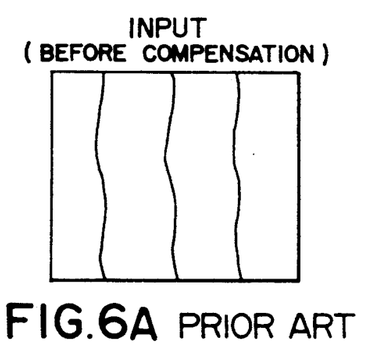
FIGS. 6A and 6B are conceptual views indicating the timebase on a conventional monitor screen.
Figure 6B:
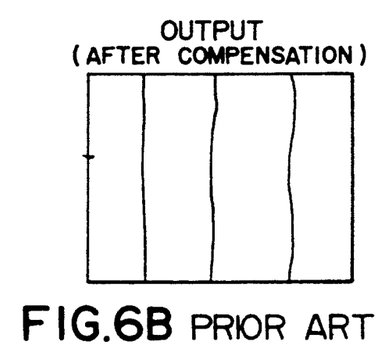

By this, as shown in FIG. 4, an automatic phase controlled (APC) clock signal is generated, which is synchronized with the horizontal sync signal with its phase being reset every time the edge of the horizontal sync signal comes. Accordingly, as shown in FIG. 5, if signals of each line of the video signal are written to the memory in accordance with the clock signal, then it is possible to compensate for the timebase error. More specifically, if there is a write operation to the memory space while there is a reset by the edge portion of the sync signal, and there is a read operation so that there is reset for each horizontal sector by the reference clock, then the signal after D/A conversion will be correctly reproduced (as shown in FIG. 6A and FIG. 6B).

The following will consider the characteristics for the timebase error compensation for the APC method and the AFC method.

Figure 7:
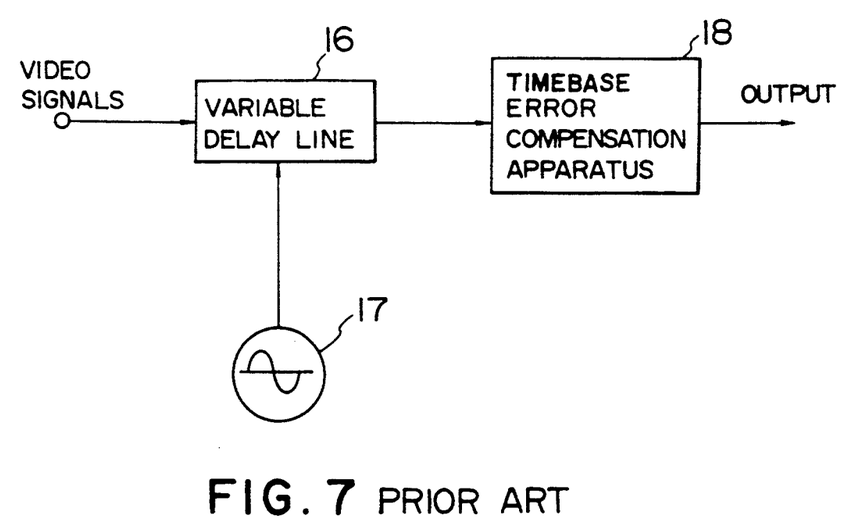
FIG. 7 is a block diagram showing the configuration of a performance measuring apparatus that is connected to a conventional timebase error compensation apparatus.

FIG. 7 shows one example of a circuit that is used for the measurement in a timebase error compensation apparatus, and a variable delay line 16 is supplied with a video signal that does not have any timebase error, and a continuous sine wave output from a sine wave oscillator 17 is supplied as a control signal. Accordingly, the input video signal having no timebase variation is elongated and contracted sinusoidally in the direction of the timebase, by the variable delay line 16, and it is supplied to a timebase error compensation apparatus 18. If the ratio of the change components (sine wave components) between the input and the output of this timebase error compensation apparatus 18 is determined, then it is possible to measure the compensation performance of this timebase error compensation apparatus.

Figure 8:
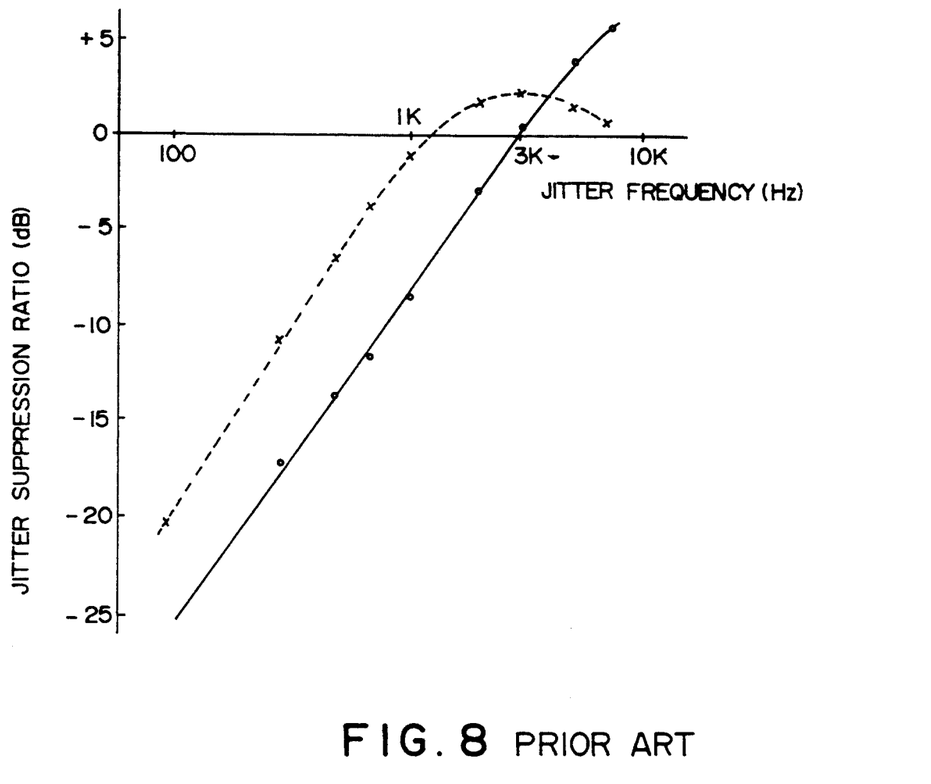
FIG. 8 is a graph that compares the timebase compensation performance between a compensation apparatus using an APC circuit and a compensation apparatus using a conventional AFC circuit.

FIG. 8 is a graph showing the timebase error compensation performance due to the APC circuit and the AFC circuit, as measured by this method. In the figure, the axis of abscissa is the change component frequency, and the axis of ordinate is the compensation performance (suppression ratio) of the change component due to the timebase error compensation apparatus. More specifically, if the ordinate is less than 0 dB, then it shows that there is a timebase error compensation performance, and if the ordinate is 0 dB or larger, that there is not only timebase error compensation performance but an adverse effect. The solid line shows the timebase error compensation performance due to the APC circuit and the dotted line shows the timebase error compensation performance due to the AFC circuit.

As seen from the figure, in the low region component in the vicinity of 1 kHz or less, the timebase error compensation apparatus using an APC circuit has an improvement effect for the timebase error of from 7 to 8 dB greater than the timebase error compensation apparatus using an AFC circuit is used, and it has a compensation performance up to the vicinity of 3 KHz.

On the other hand, the timebase error compensation apparatus using an AFC circuit does not compensate for timebase error for components having frequencies of approximately 1 KHz or greater, and when compared to the case where an APC circuit is used, it has poorer characteristics.

In general, the change component is less visually conspicuous for the higher the region and there is the tendency for the change component itself to become smaller for the higher the region.

However, even the timebase error compensation apparatus using an APC circuit cannot follow a velocity error which expands and contracts greatly within a horizontal scan period and which is generated at a switching point at which the reproducing heads are switched over in a VTR format for home use. In addition, the switching point changes continuously with a width of several $\mu s$ or so in response to a tape tension, a low frequency jitter etc. of tape jitter, and the signals of the horizontal scan lines before and after the horizontal scan portion that includes the switching point are sufficient by compensated for the timebase error, and so the error in the horizontal scan line that includes the switching point is especially conspicuous visually.

Because of this, setting the switching point to a horizontal scan line other than a valid scan line on the monitor screen is made so that the disturbance in the image due to the switching point cannot be seen, but with large-screen monitors, the range of the valid scan lines has widened and disturbances in the switching points have come to be seen.

Figure 9:
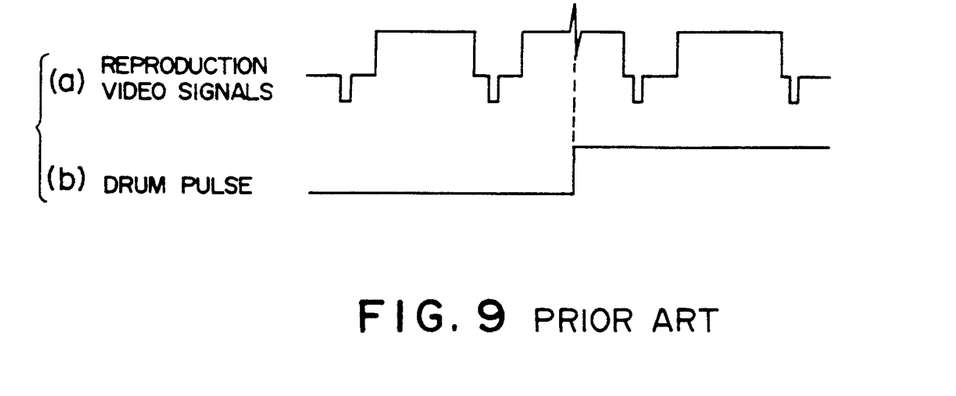
FIG. 9 is a timing chart for describing the timing and the drum pulse and switching point in a conventional apparatus.
Figure 10:
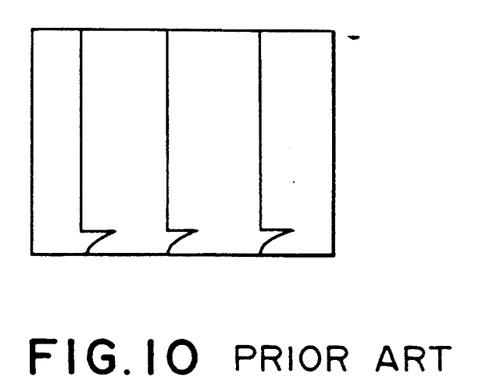
FIGS. 10 and 11 are conceptual diagrams that show how the switching point appears on a monitor screen in the conventional apparatus.
Figure 11:
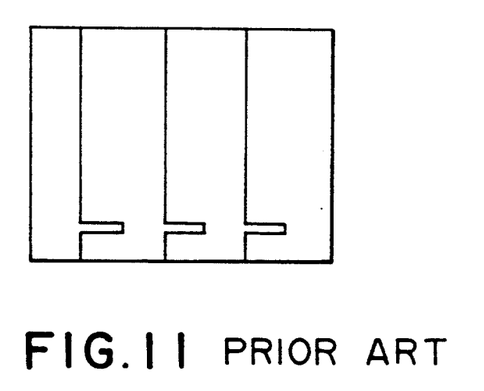

FIG. 9 through FIG. 11 show this condition. More specifically, as shown in FIG. 9, noise appears in the reproduced video signal in syncronism with the edge (switching point) of the drum pulse. As shown in FIG. 10, the error component due to the switching point that appears at the bottom of the screen is not removed by even the timebase error compensation apparatus using an APC circuit, and is output as shown in FIG. 11.

SUMMARY OF THE INVENTION

A timebase error compensation apparatus according to the present invention is proposed to eliminate the problems described above, and has as its object the prevention of the generation of velocity error that is caused by switching point.

The timebase error compensation apparatus of the present invention in a VTR having a plurality of rotary reproducing heads which are sequentially switched over by signals from a video tape to obtain a continuous reproduced video signal, comprises a compensation circuit for compensating for a timebase error included in the reproduced video signal; a detection circuit for detecting a horizontal scan line period when the signal from one head is switched over to the signal from another head to generate a mask control signal; and a replacement circuit responsive to the mask control signal for replacing the reproduced video signal of the horizontal scan line period with the reproduced video signal of a horizontal scan line period adjacent to the horizontal scan line period.

In the timebase error compensation apparatus described above, there is provided a switch that selects one of the signals that have been delayed by the delay circuit and those signals that have not been delayed and so when there is the generation of a horizontal scan line that includes a switching point, it is possible to output a horizontal scan line of 1 H prior for example, and that does not include a switching point. In addition, the horizontal scan lines that generate the switching points are obtained from a drum pulse and so it is not necessary to have a special detection means for the switching point.

According to the timebase error compensation apparatus as described above, a horizontal scan lines that includes a switching point, is converted into data of other horizontal scan lines by the use of the delay circuit and the switching and so it is possible to prevent the generation of velocity errors that are caused by switching points.

DETAILED DESCRIPTION OF THE PREFERRED EMBODIMENTS

The following is a description of an embodiment of the present invention, with reference to the appended drawings. Moreover, those portions that are the identical or similar to corresponding portions of the conventional apparatus, are indicated with corresponding reference numerals, and the corresponding description of them is omitted.

Figure 12:
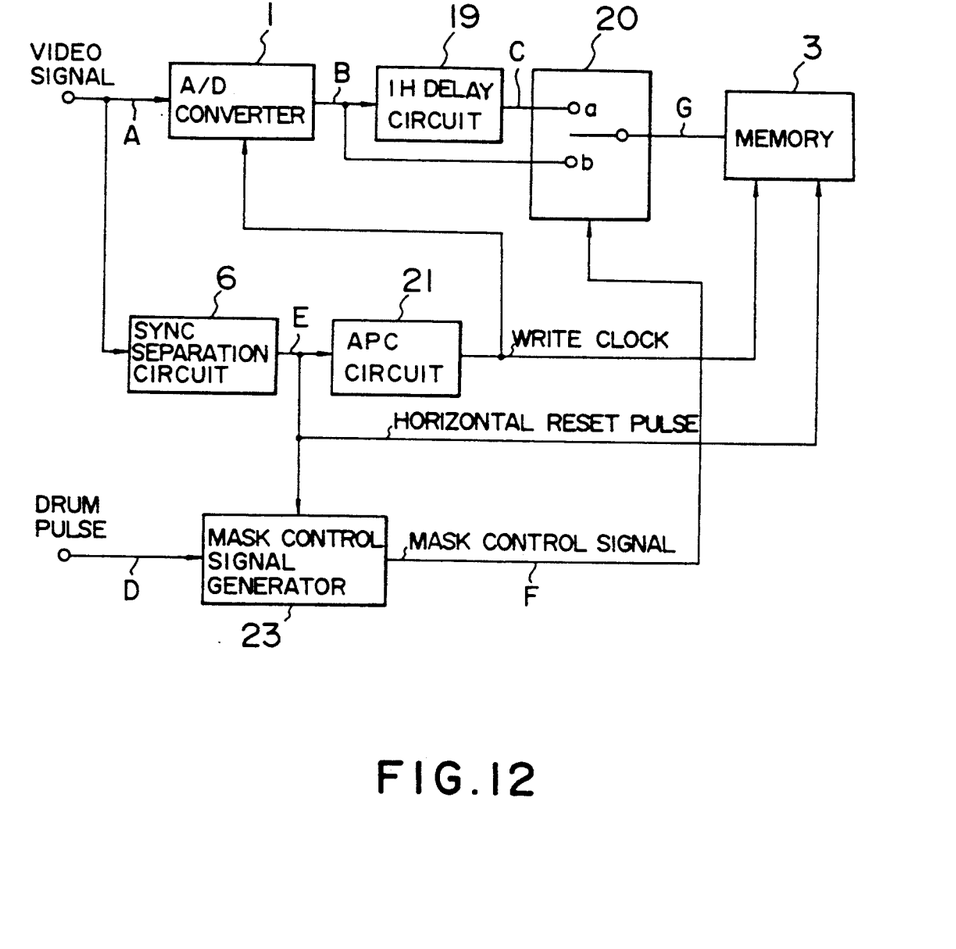
FIG. 12 is a block diagram that indicates the configuration of a timebase error compensation apparatus relating to an embodiment of the present invention.

FIG. 12 is a block diagram that indicates the configuration of a timebase error compensation apparatus relating to a first embodiment of the present invention.

In the A/D converter 1, the input video signals undergoes A/D conversion by the write clock generated by an APC in syncronism with the phase of the horizontal sync signal circuit 21. The video signal that has undergone A/D conversion is supplied to one of the terminals b of a switch 20 and are also supplied to the other terminal a of the switch 20 via the 1H delay circuit.

The output of the sync separation circuit 6 is supplied to the APC circuit 21 and is also supplied to a mask control signal generator 23 as a trigger signal. The mask control signal generator 23 receives a drum pulse from a controller not indicated in the figure, and generates a mask control signal that becomes the H level during one horizontal scan period from the time of generation of the first horizontal sync signal after the generation of the drum pulse. The mask control signal operates as a switching control signal for the switch 20. When the mask control signal is at the H level, the switch 20 selects the side of the terminal b and supplies the video signal that has not been delayed, to the memory 3, and when the mask control signal is at the L level, selects the side of the terminal a and supplies the video signal that has been delayed by 1 H (one horizontal scan period) to the memory 3.

In addition, the horizontal sync signal that has been separated by the sync separation circuit 6 is applied to the memory 3 as horizontal reset pulse.

The following is a description of the operation of a timebase error compensation apparatus having the configuration described above.

First, since the timebase error compensation apparatus using an APC circuit is reset by the horizontal sync signal on the memory for each horizontal scan line, the influence of the switching point appears for only a single horizontal scan line. In addition, since the switching point of the heads is syncronized with the drum pulse of the VTR, the position where the switching point appears, can be judged from the drum pulse.

Accordingly, at the time of generation of a sync pulse immediately after the generation of an edge of a drum pulse, and depending upon the mask control signal being H level, the switching circuit that has up to then supplied the memory 3 with signal that has been delayed by one horizontal scan period, switches so that signal that has not been delayed is supplied to the memory 3. Thus, the horizontal scan line that includes switching point is no longer written to the memory 3 and no switching points are included in the data that undergo the timebase compensation processing.

Figure 13:
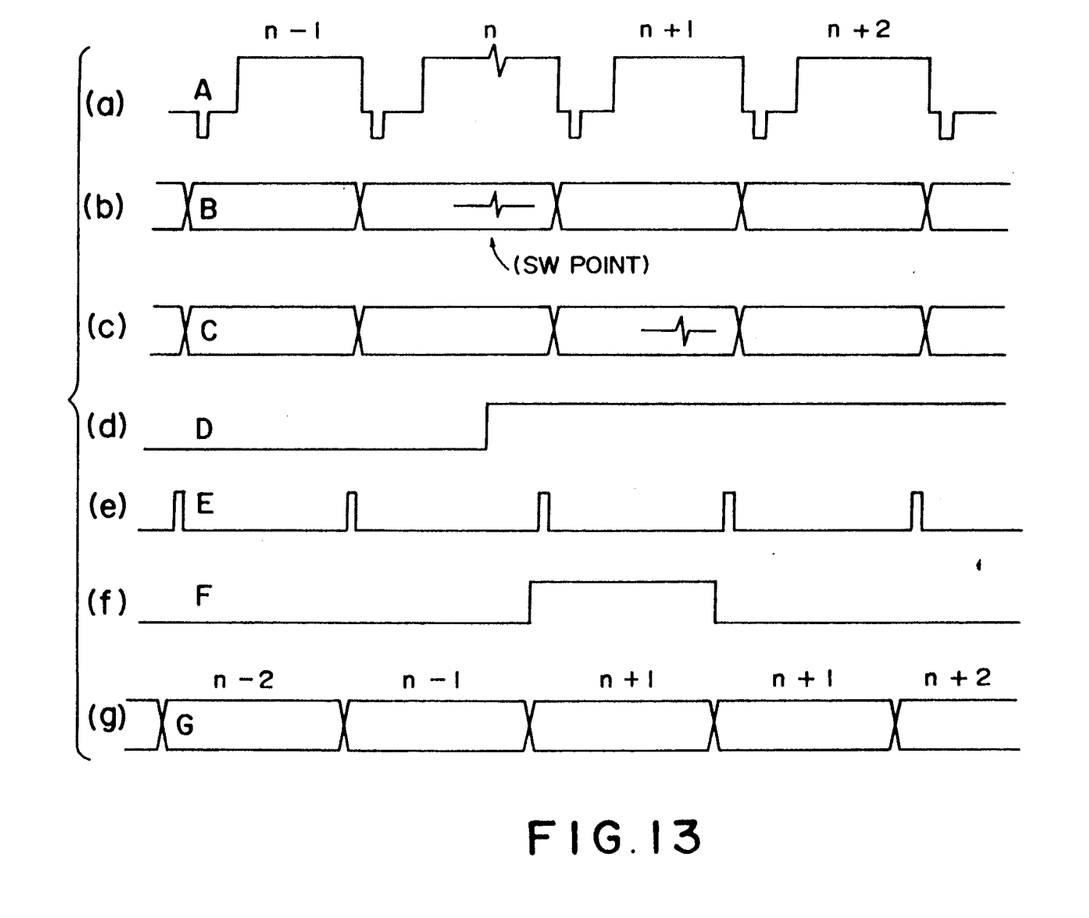
FIG. 13 is a timing chart for describing the operation of the compensation apparatus shown in FIG. 12.

FIG. 13 is a timing chart for describing the timebase error compensation operation of the compensation apparatus shown in FIG. 12. As shown in FIG. 13 (a), it is assumed that a switching point is included in n-th line of input video signal. FIG. 13 (b) shows data that has undergone A/D conversion and FIG. 13 (c) shows data that has been 1 delayed by 1H. Normally, the switch 20 selects the output [FIG. 13 (c)] that has been delayed by 1H. And, there is a relationship of syncronization between the switching point and the drum pulse [FIG. 13 (d)]. Hence, for one horizontal scan period from the horizontal sync signal [FIG. 13 (e)] immediately after the drum pulse that is generated during the n-th line of input signal, the switch 20 is switched by the mask control signal [FIG. 13 (f)] and the video signal [FIG. 13 (b)] that has not been delayed is selected, so that the switching point does not appear in the output [FIG. 13 (g)] of the switch 20, and that it is possible to prevent the generation of velocity error that cannot be removed even by a conventional timebase error compensation apparatus using an APC circuit.

Although, in the embodiment shown in FIG. 12, the signal of the horizontal scan line including the switching point is replaced by the signal of the next horizontal scan line by using the 1H delay circuit 19 and the switch 20 which are arranged after the A/D converter 1 and which process analog data, the present invention is not limited to such arrangement. Some variations of the embodiment will be described in the following.

Figure 14A:
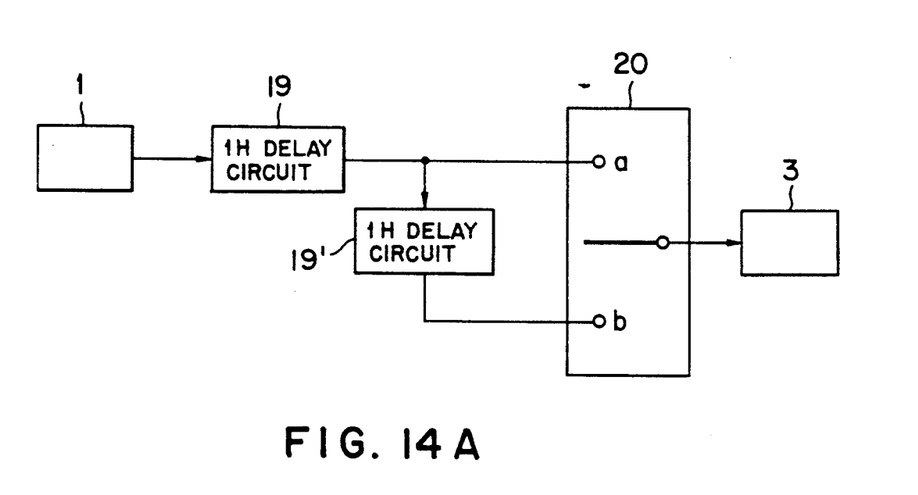
FIGS. 14A and 14B are block diagrams that indicate variations of the embodiment shown in FIG. 12.
Figure 14B:
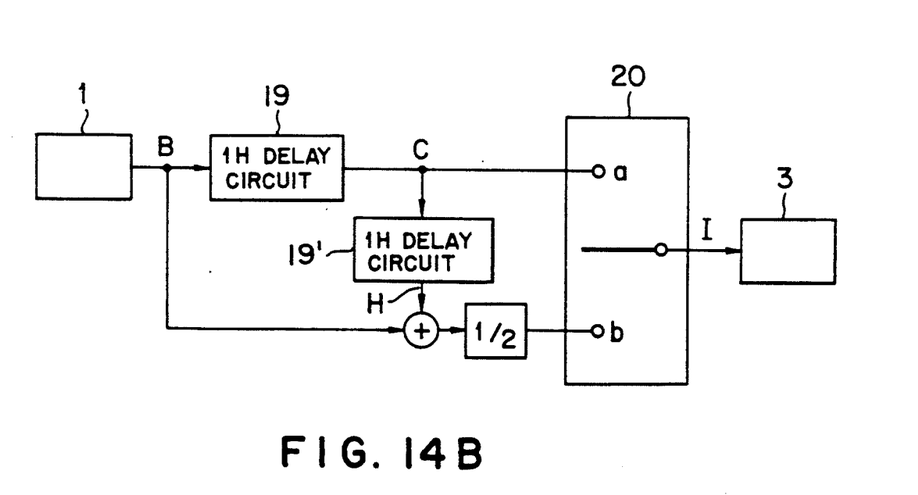
Figure 15:
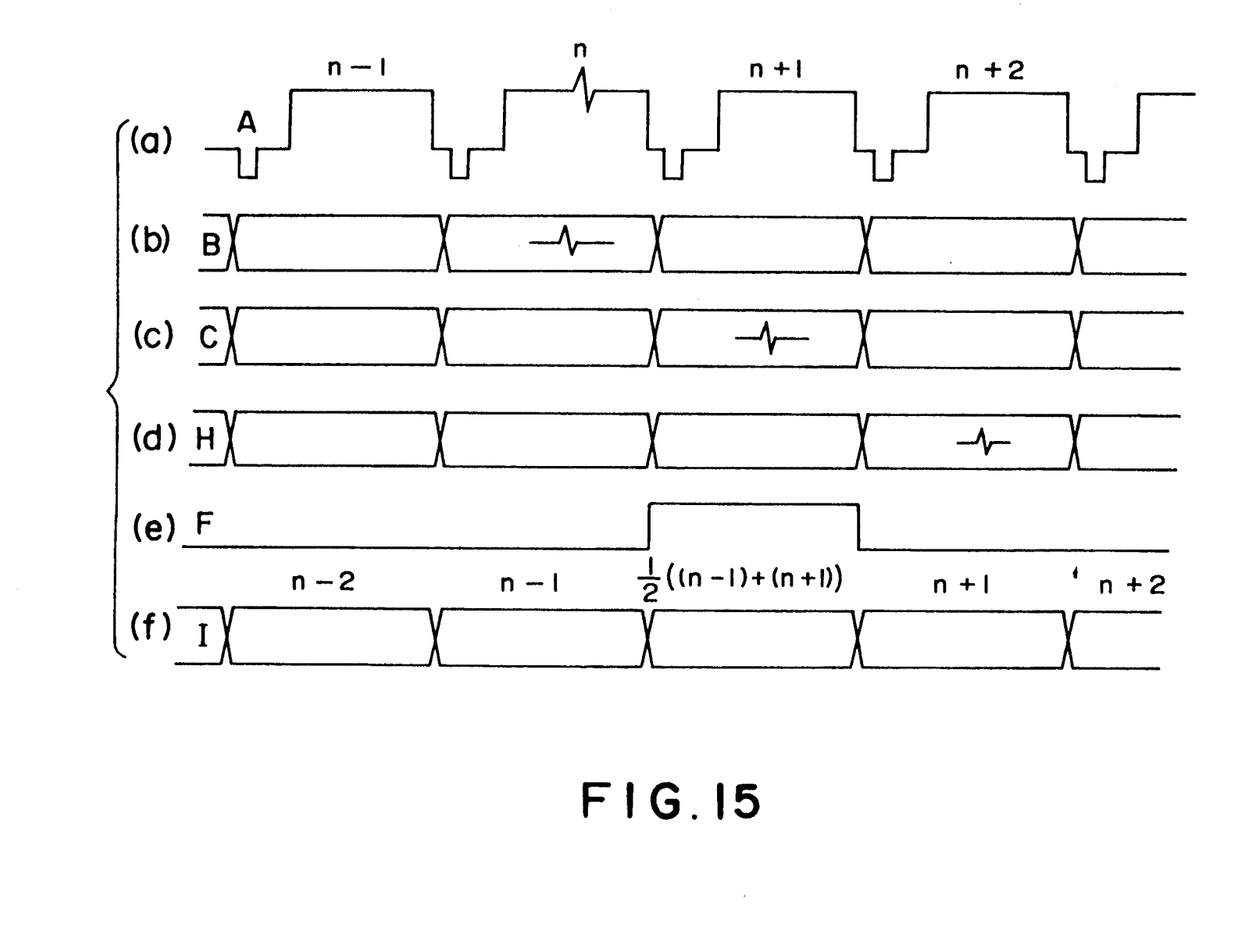
FIG. 15 is a timing chart for describing the operation of the compensation apparatus in which the variation shown in FIG. 14B is adopted.

By using two 1H delay circuits connected in series, the signal of the horizontal scan line including the switching point may be replaced by the signal of the previous horizontal scan line or an arithmetic mean signal of the signals of the previous and next horizontal scan lines, by an arrangement shown in FIGS. 14A or 14B. In case of FIG. 14B, the time chart for which is shown in FIG. 15, not only the switching point is eliminated, but it is also possible to limit the degradation of vertical resolution.

Figure 16:
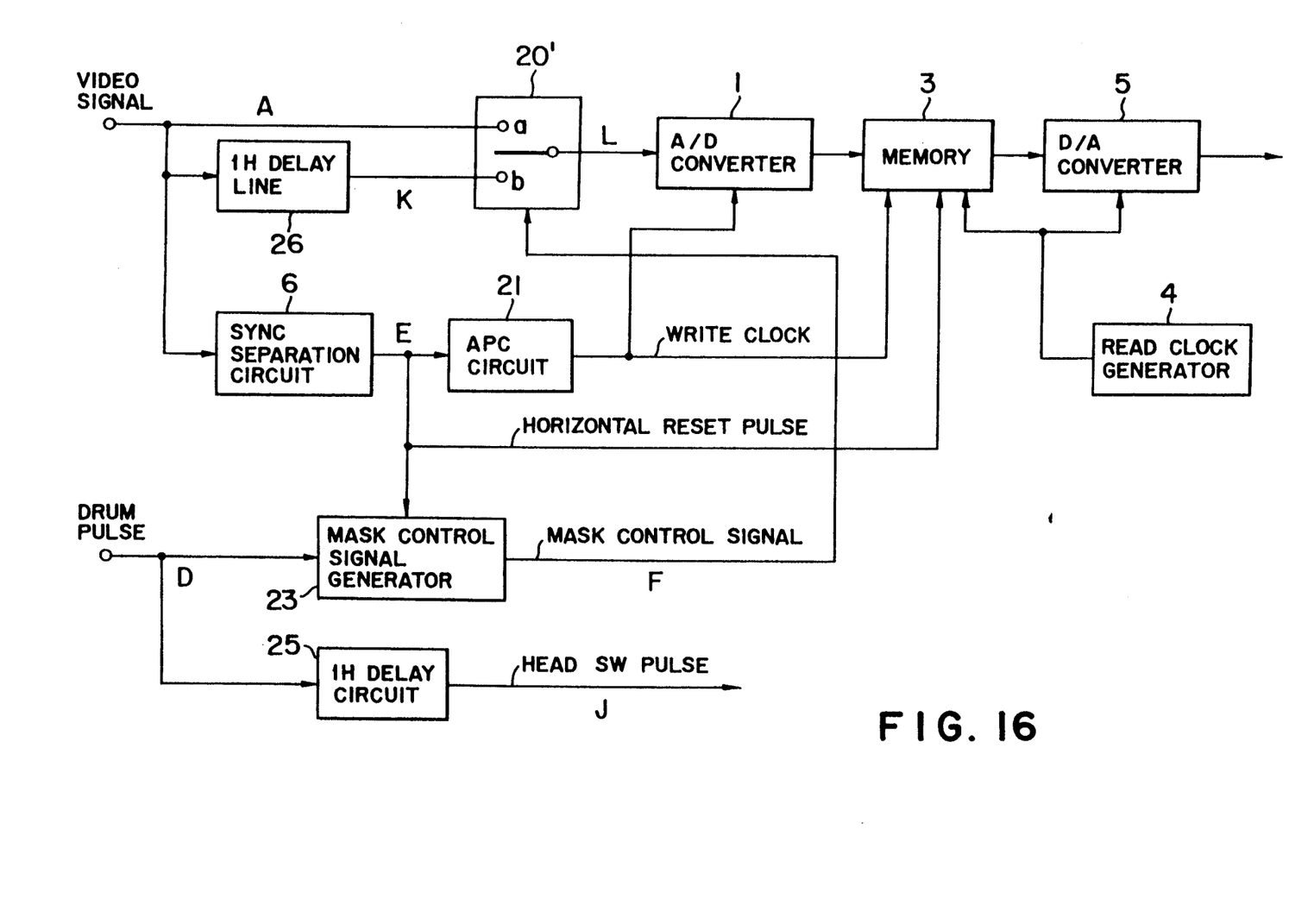
FIG. 16 is a block diagram that indicate another variation of the embodiment shown in FIG. 12.
Figure 17:
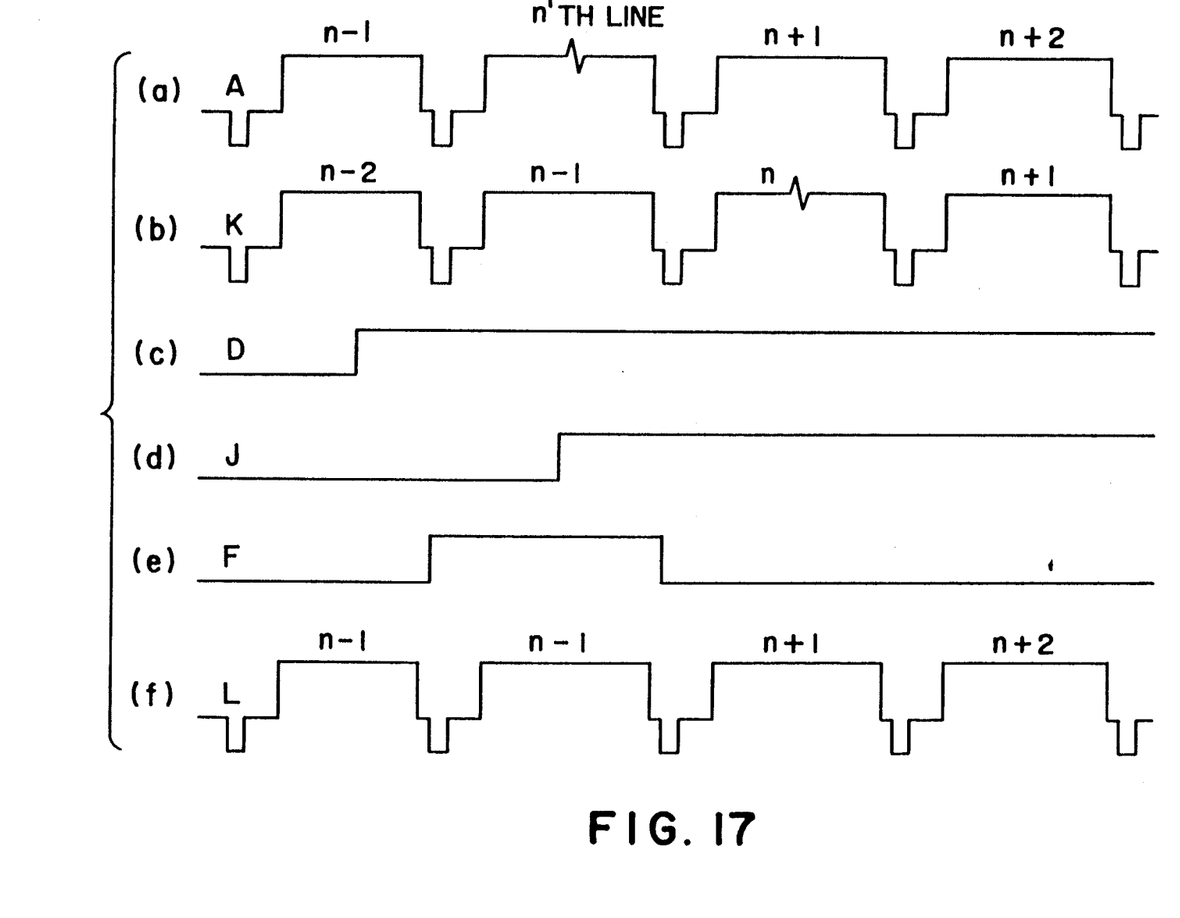
FIG. 17 is a timing chart for describing the operation of the compensation apparatus shown in FIG. 16.

Furthermore, the replacement of the horizontal scan line may be performed in analog before the A/D conversion. And the present invention can be embodied also by an arrangement shown in FIG. 16, in which, the drum pulse is delayed by 1H by a 1H delay circuit 25 such as a D-type flip-flop, and the delayed drum pulse is used for a head switch pulse, while the mask control signal is generated on the basis of the drum pulse that has not been delayed, so that the non-delayed drum pulse occurs during the (n−1)'-th line and the head switching is performed during the n'-th line. And while the signal of the n'-th line is input, an analog switch 20' normally selecting non-delayed video signal is controlled to select the signal of the (n−1)'th line that is delayed by an analog 1H delay line 26. FIG. 17 shows the time chart for the arrangement shown in FIG. 16.

Still furthermore, although the replacement of the horizontal scan lines is performed before the compensation of the timebase error in the above description, the apparatus of this invention may perform the replacement of the horizontal lines after the compensation of the timebase error.

What is claimed is:

1. A timebase error compensating apparatus in a video tape recorder (VTR) for compensation for a timebase error included in a reproduced video signal, said apparatus comprising:

delay means for delaying said reproduced video signal a time period corresponding to one horizontal period;

signal generation means responsive to a drum pulse generated in said VTR for generating a control signal which represents one line of a horizontal scan of said reproduced video signal corresponding to a first horizontal sync signal which is separated from said reproduced signal;

changeover means for selecting for output either an output signal of said delay means or said reproduced video signal in response to said control signal; and compensation means for compensating for the timebase error included in an output signal of said changeover means.

2. The timebase error compensation apparatus in a video tape recorder (VTR) for compensation for a timebase error included in a reproduced video signal, said apparatus comprising:

delay means for outputting a first delay signal and a second delay signal, wherein said first delay signal is generated by delaying said reproduced video signal for one horizontal scan period, and wherein said second delay signal is generated by delaying said reproduced video signal for two horizontal scan periods;

signal generating means responsive to a drum pulse generated in said VTR for generating a control signal which represents one line of a horizontal scan of said reproduced video signal corresponding to a first horizontal sync signal;

calculation means for performing an arithmetic operation on said reproduced video signal and said second delay signal to generate an output signal;

changeover means responsive to said control signal for selecting for output either the output signal of said calculation means or said first delay signal; and compensation means for compensating for the timebase error included in an output signal of said changeover means.

3. The apparatus of claim 2, wherein said calculation means receives as input said reproduced video signal and said second delay signal and generates an output signal which is an arithmetic mean of the reproduced video signal and the second delay signal.

* * * * *